(12) United States Patent
Naiva

(10) Patent No.: US 10,182,629 B2
(45) Date of Patent: Jan. 22, 2019

(54) WHEELED DEVICE AND WHEEL ASSEMBLY

(71) Applicant: MILWAUKEE ELECTRIC TOOL CORPORATION, Brookfield, WI (US)

(72) Inventor: Matthew W. Naiva, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 85 days.

(21) Appl. No.: 15/337,769

(22) Filed: Oct. 28, 2016

(65) Prior Publication Data

US 2017/0120679 A1   May 4, 2017

Related U.S. Application Data

(60) Provisional application No. 62/248,691, filed on Oct. 30, 2015.

(51) Int. Cl.

| | |
|---|---|
| *A45C 5/14* | (2006.01) |
| *B60B 33/00* | (2006.01) |
| *B29C 45/16* | (2006.01) |
| *B29C 45/14* | (2006.01) |
| *B60C 7/10* | (2006.01) |
| *B25H 3/02* | (2006.01) |
| *B29K 75/00* | (2006.01) |

(Continued)

(52) U.S. Cl.
CPC .......... *A45C 5/14* (2013.01); *B29C 45/14811* (2013.01); *B29C 45/1671* (2013.01); *B60B 33/0028* (2013.01); *B25H 3/02* (2013.01); *B29C 2045/1495* (2013.01); *B29C 2045/1681* (2013.01); *B29K 2075/00* (2013.01); *B29K 2995/0046* (2013.01); *B29L 2031/322* (2013.01); *B60C 7/102* (2013.01); *B60C 2200/00* (2013.01); *B62B 1/10* (2013.01); *B62B 2202/48* (2013.01); *B62B 2301/25* (2013.01)

(58) Field of Classification Search
CPC ......... A45C 5/14; A63C 17/22; A63C 17/223; B60B 33/0028; B60B 33/0036; B60B 33/0049; B25H 3/02
USPC ......... 301/5.301, 5.302, 5.303, 5.304, 5.305, 301/5.306, 5.307, 5.308, 5.309; 152/379.3
See application file for complete search history.

(56) References Cited

U.S. PATENT DOCUMENTS

| | | |
|---|---|---|
| 1,943,620 A | 1/1934 | Murray |
| 2,267,403 A | 12/1941 | Herold |
| 2,444,053 A | 6/1948 | Lyon |

(Continued)

*Primary Examiner* — Kip T Kotter
(74) *Attorney, Agent, or Firm* — Reinhart Boerner Van Deuren s.c.

(57) ABSTRACT

A wheel assembly, a wheeled device and a method of manufacturing a wheel assembly. The wheel assembly includes a core and an outer portion coupled to the core. The core includes a body and one or more projections extending from the body. Material of the outer portion may be positioned radially between the body and a portion of the projection to limit radial movement of the outer portion relative to the core. The projection may define a bore and/or an undercut. Material of the outer portion may encompass the projection and fill the bore and/or the undercut. Engagement of the material of the outer portion and the projection(s) may limit relative movement between the core and the outer portion radially, axially, circumferentially, etc.

22 Claims, 22 Drawing Sheets

(51) Int. Cl.
*B29L 31/32* (2006.01)
*B62B 1/10* (2006.01)

(56) References Cited

U.S. PATENT DOCUMENTS

| | | | |
|---|---|---|---|
| 2,757,975 A | 8/1956 | Lyon | |
| 2,808,907 A | 10/1957 | Lyon | |
| 2,862,768 A | 12/1958 | Lyon | |
| 2,865,677 A | 12/1958 | Lyon | |
| 2,865,678 A | 12/1958 | Lyon | |
| 2,879,107 A | 3/1959 | Lyon | |
| 2,898,149 A | 8/1959 | Lyon | |
| 2,906,560 A | 9/1959 | Lyon | |
| 2,952,491 A | 9/1960 | Lyon | |
| 2,963,318 A | 12/1960 | Lyon | |
| 2,977,152 A | 3/1961 | Lyon | |
| 2,991,128 A | 7/1961 | Lyon | |
| 3,009,743 A | 11/1961 | Lyon | |
| 3,025,111 A | 3/1962 | Lyon | |
| 3,025,112 A | 3/1962 | Lyon | |
| 3,670,361 A | 6/1972 | Brassington et al. | |
| 4,027,919 A | 6/1977 | Foster et al. | |
| 4,247,152 A | 1/1981 | Brown | |
| 4,266,831 A | 5/1981 | Foster et al. | |
| 4,351,084 A * | 9/1982 | Fontana | B60B 33/0028 16/45 |
| 4,352,525 A | 10/1982 | Foster et al. | |
| 4,408,804 A | 10/1983 | Marshall, Jr. | |
| 4,447,093 A * | 5/1984 | Cunard | B29C 45/1676 152/323 |
| 4,470,639 A | 9/1984 | Löper | |
| 4,531,786 A | 6/1985 | Renz et al. | |
| 4,529,251 A | 7/1985 | Schobbe | |
| 4,596,425 A | 6/1986 | Hung | |
| 4,738,490 A | 4/1988 | Lorn | |
| 5,141,291 A | 8/1992 | Roulinson | |
| 5,156,443 A | 10/1992 | Ide | |
| 5,224,642 A * | 7/1993 | Davis | B65B 41/16 226/190 |
| 5,567,019 A * | 10/1996 | Raza | A63C 17/223 301/5.307 |
| 5,660,447 A * | 8/1997 | Angelici | A63C 17/223 152/323 |
| 5,725,284 A * | 3/1998 | Boyer | A63C 17/223 301/5.302 |
| 5,797,658 A * | 8/1998 | Larrucea | A63C 17/24 152/323 |
| 5,897,170 A * | 4/1999 | Keleny | A63C 17/223 152/323 |
| D421,083 S * | 2/2000 | Chen | D21/779 |
| 6,036,278 A * | 3/2000 | Boyer | A63C 17/223 152/323 |
| D434,463 S * | 11/2000 | Lin | D21/779 |
| 6,227,622 B1 * | 5/2001 | Roderick | A63C 17/223 152/323 |
| 6,629,735 B1 * | 10/2003 | Galy | A63C 17/223 301/5.301 |
| 6,655,747 B2 * | 12/2003 | Young | A63C 17/223 301/5.301 |
| 6,679,560 B1 * | 1/2004 | van Egeraat | A63C 17/223 301/5.306 |
| 6,752,471 B2 * | 6/2004 | Hsia | B29C 39/10 301/5.307 |
| 7,108,331 B2 * | 9/2006 | Hurwitz | A63C 17/0066 152/40 |
| 7,657,969 B2 | 2/2010 | Trivini | |
| 9,162,527 B1 * | 10/2015 | Harrelson | B60B 33/0028 |
| 9,630,450 B1 * | 4/2017 | Chang | B60B 33/0039 |
| 2003/0168904 A1 * | 9/2003 | Frigo | A63C 17/22 301/5.307 |

\* cited by examiner

US 10,182,629 B2

WHEELED DEVICE AND WHEEL ASSEMBLY

CROSS-REFERENCE TO RELATED APPLICATION

This application claims priority to co-pending U.S. Provisional Patent Application No. 62/248,691, filed on Oct. 30, 2015, the entire contents of which is hereby incorporated by reference.

FIELD

The present invention relates to wheeled devices and, more particularly, to a wheel assembly for such devices.

SUMMARY

Typically, wheel assemblies of wheeled devices, such as a rolling tool bags, include wheels formed of a single hard material. Other wheels include a core formed of a relatively hard material with a relatively soft over-molded portion. The soft over-molded portion is more flexible than the core so as to provide more comfort to the user, decrease sound, and increase the impact resistance of the wheel. However, the soft over-molded portion is typically formed or adhered directly to a cylindrical outer surface of the core and may fail to remain coupled to the outer surface after prolonged use of the wheeled device.

In one independent aspect, a wheel assembly for a wheeled device may be provided. The wheel assembly may generally include a core including an annular body defining a central axis and one or more projections extending from the body; and an outer portion coupled to the core and having material positioned radially between the body and a portion of each of the one or more projections to limit radial movement of the outer portion relative to the core.

In some constructions, the projection may define a throughbore and/or an undercut, and material of the outer portion may encompass the projection and fill the throughbore and/or the undercut. Engagement of the material of the outer portion and the projection(s) may limit relative movement between the core and the outer portion radially, axially, circumferentially, etc. and combinations thereof.

In another independent aspect, a wheeled device may generally include a frame; and a wheel assembly supporting the frame, the wheel assembly including a core coupled to the frame for pivoting movement about a central axis, the core including a body and one or more projections extending from the body, and an outer portion coupled to the core, the outer portion having material positioned radially between the body and a portion of each projection to limit movement of the outer portion relative to the core.

In yet another independent aspect, a method of manufacturing a wheel assembly for a wheeled device may be provided. The method may generally include forming a core including a body and one or more projections extending from the body; and forming an outer portion onto the core including providing material of the outer portion radially between the body and a portion of each projection.

Other independent features and independent aspects of the invention may become apparent by consideration of the following detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Figure 1:
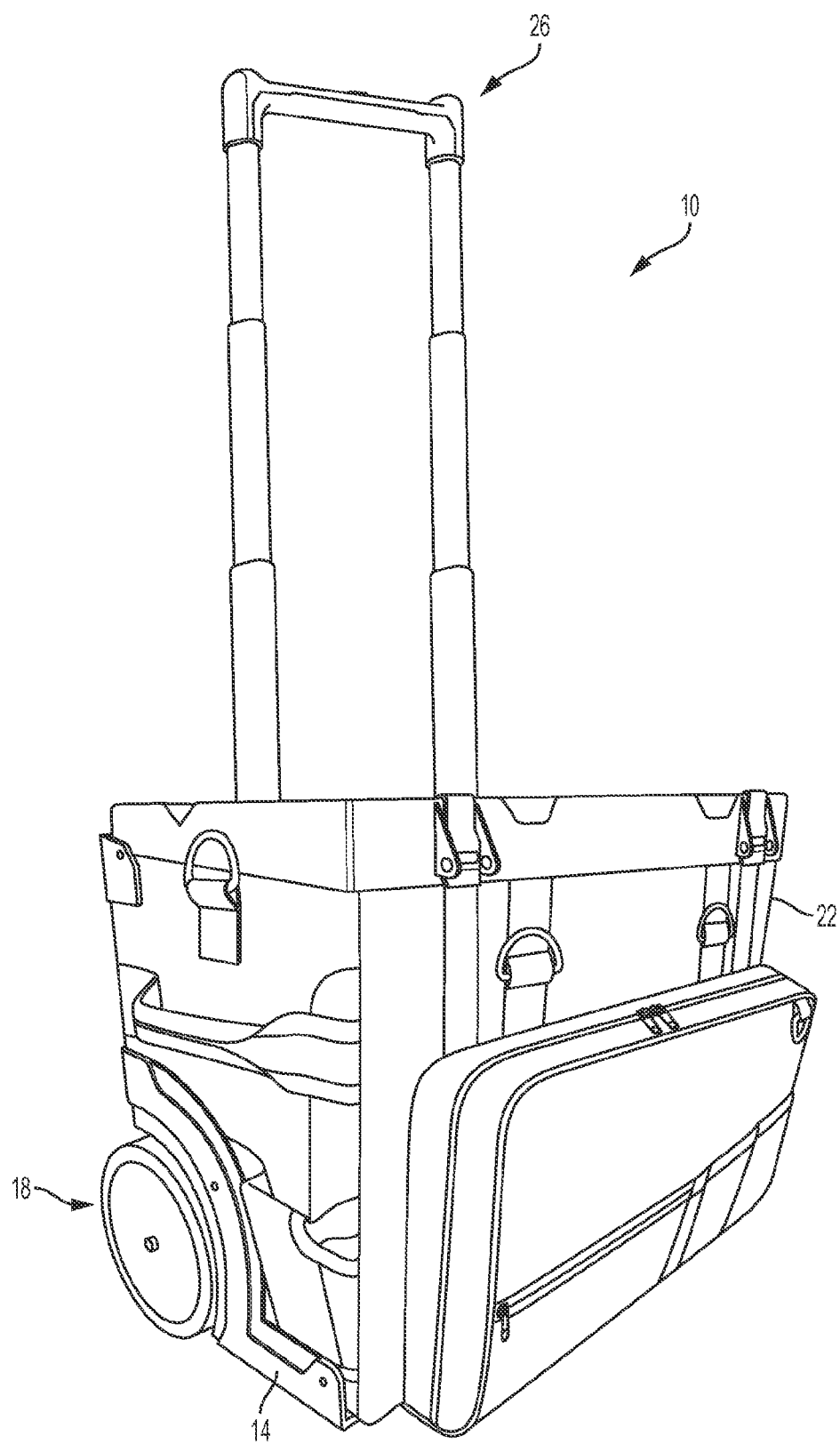
FIG. 1 is a front perspective view of a wheeled device, such as a portable rolling tool bag.
Figure 2:
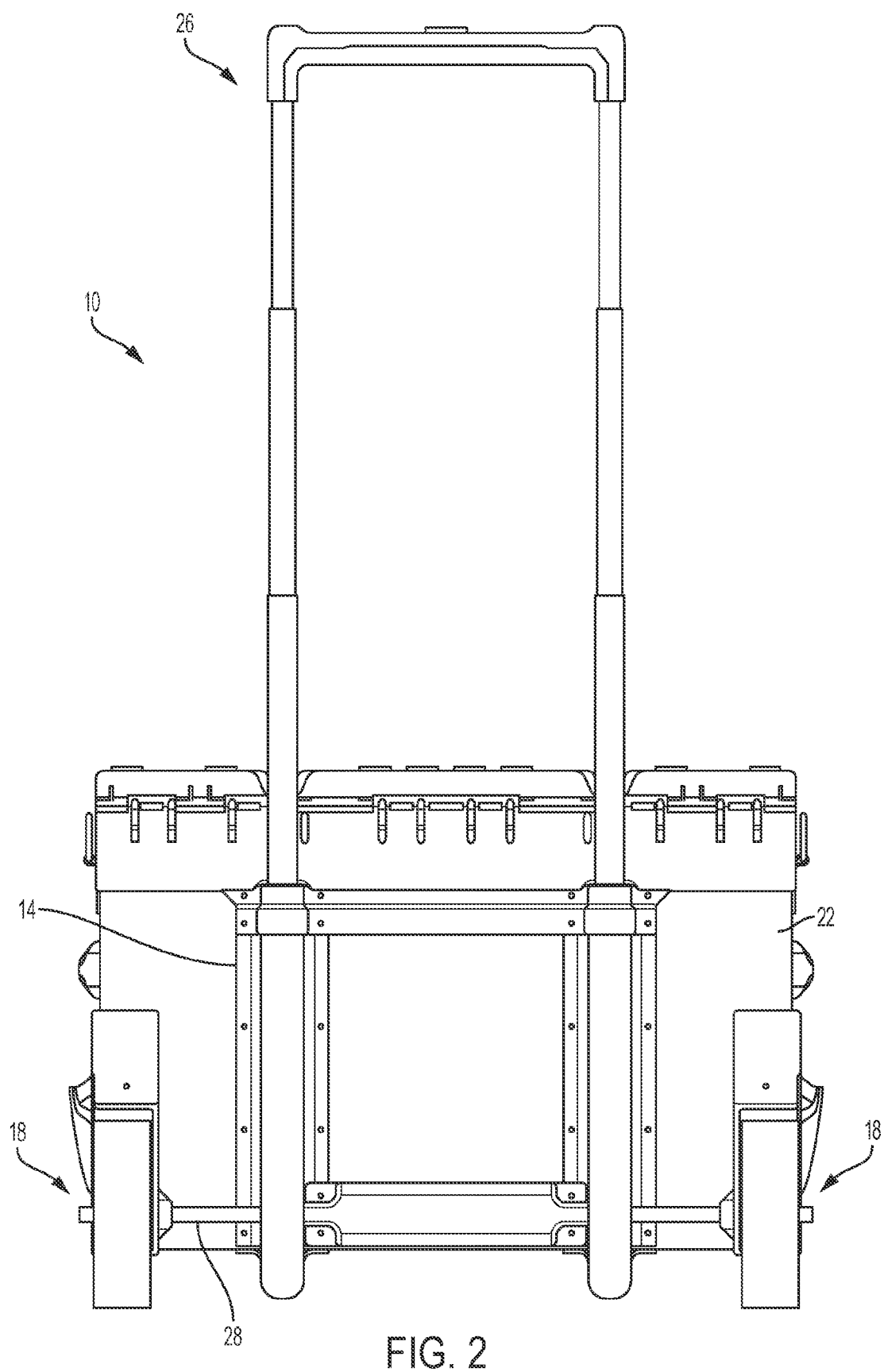
FIG. 2 is a rear view of the wheeled device shown in FIG. 1.
Figure 3:
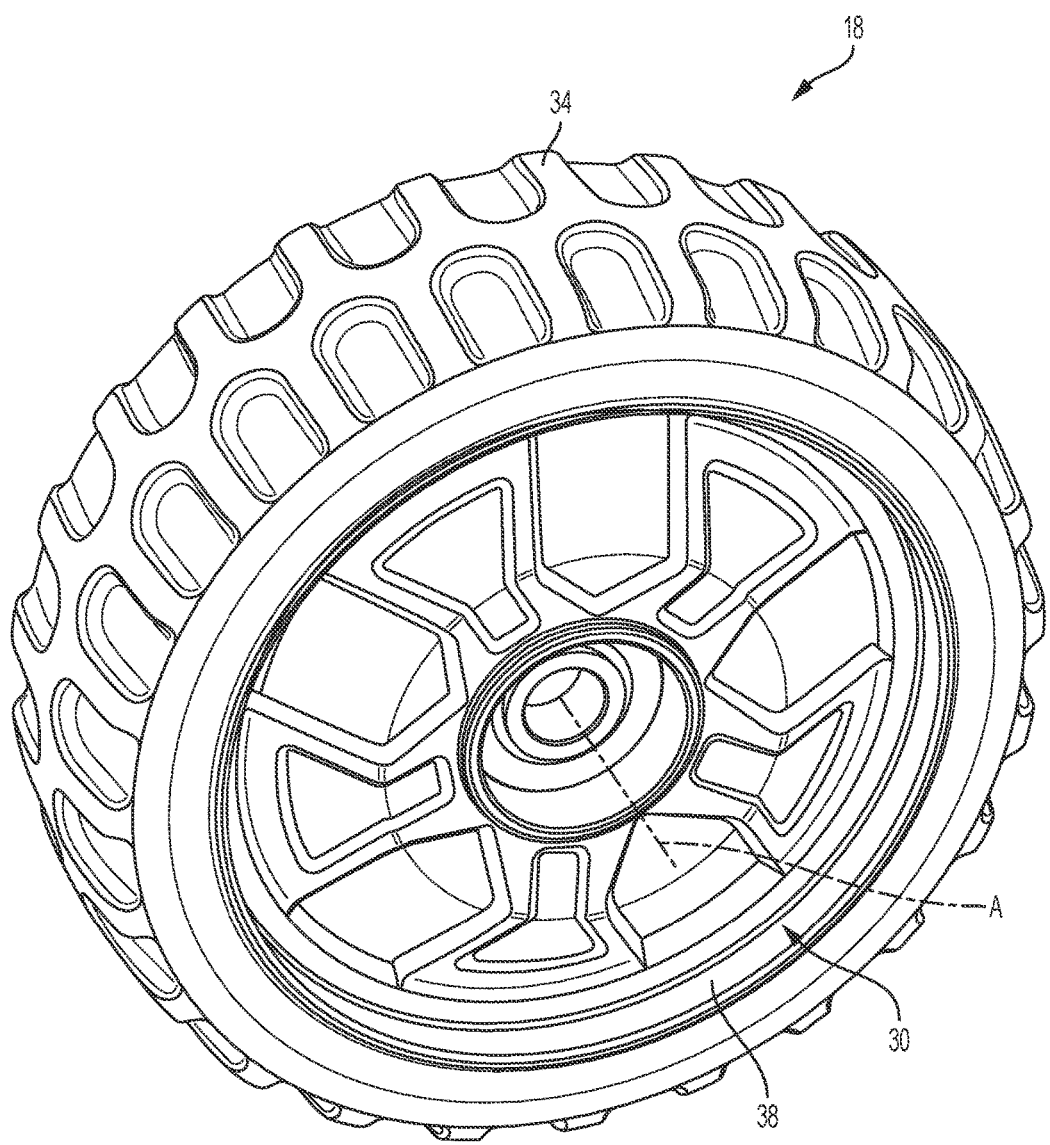
FIG. 3 is a front perspective of a wheel assembly for the wheeled device shown in FIG. 1.
Figure 4:
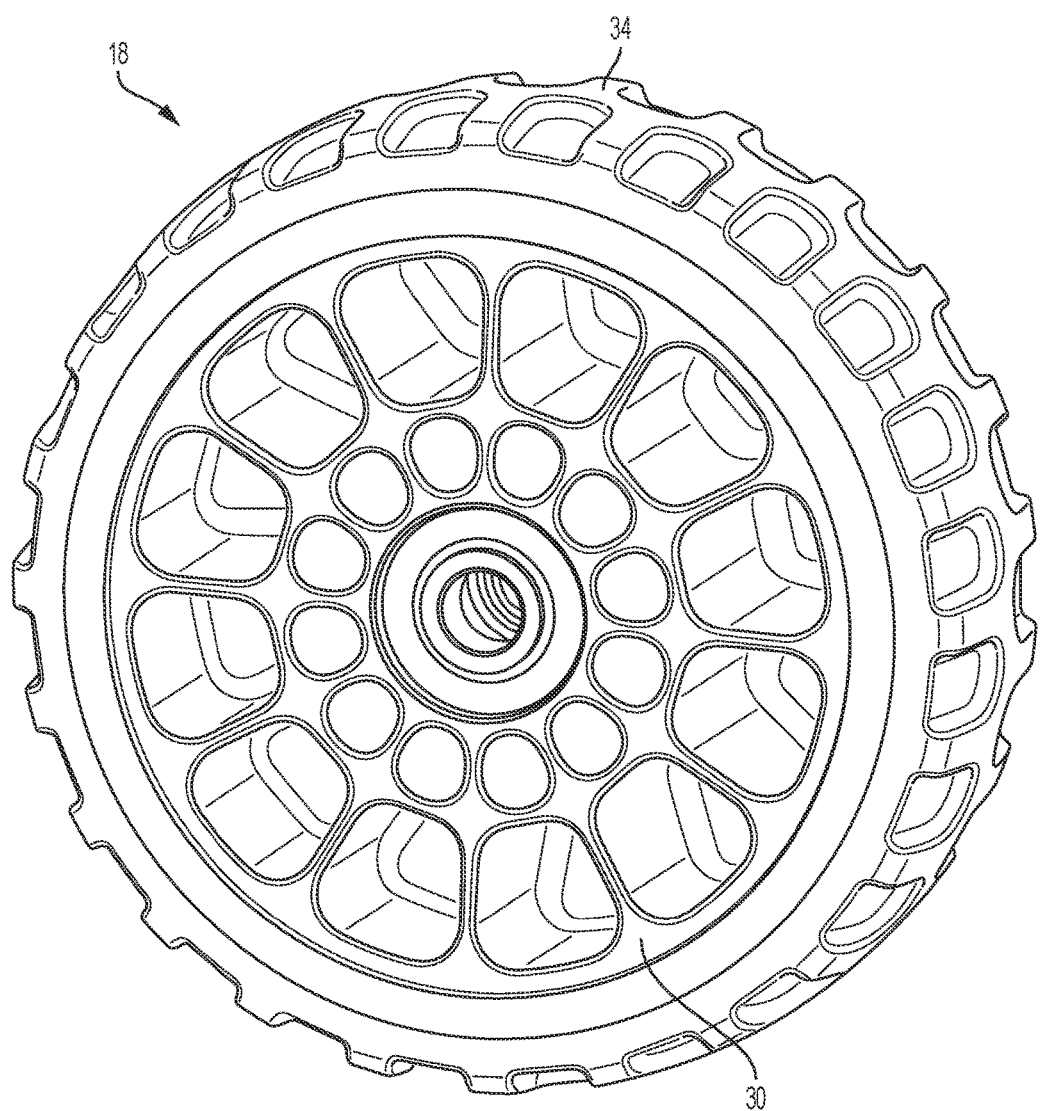
FIG. 4 is a rear perspective view of the wheel assembly shown in FIG. 3.
Figure 5:
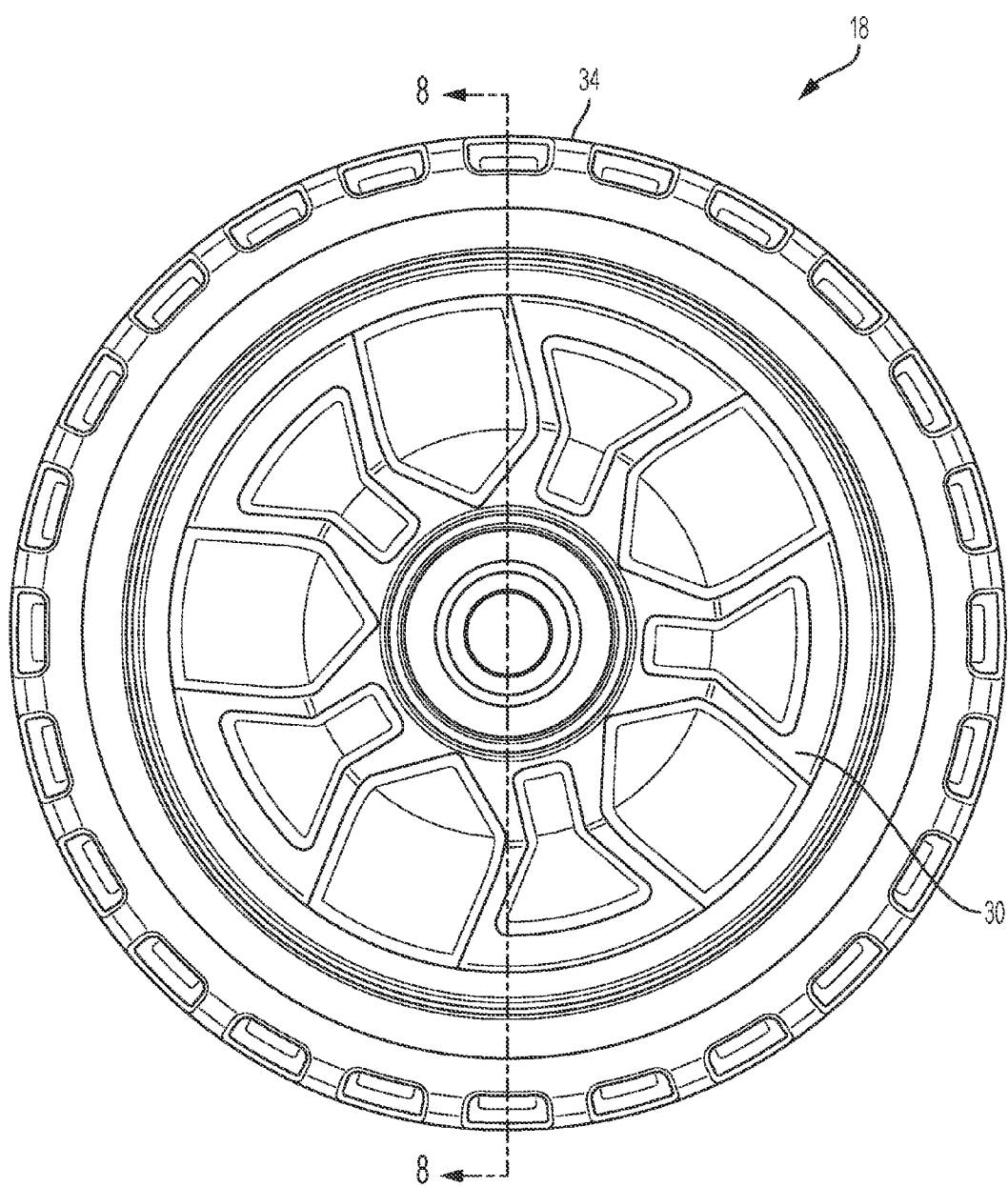
FIG. 5 is a front view of the wheel assembly shown in FIG. 3.
Figure 6:
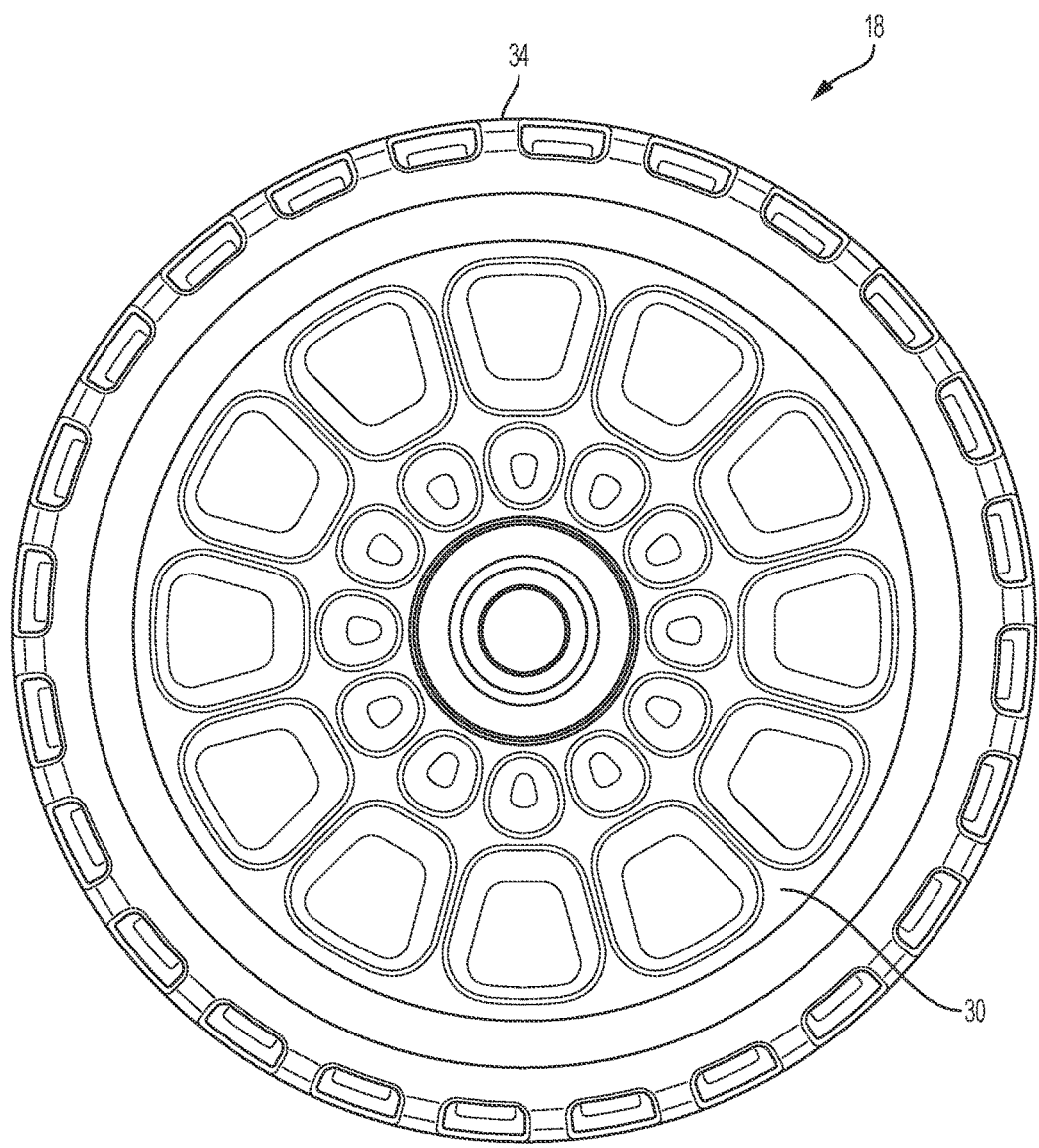
FIG. 6 is a rear view of the wheel assembly shown in FIG. 3.
Figure 7:
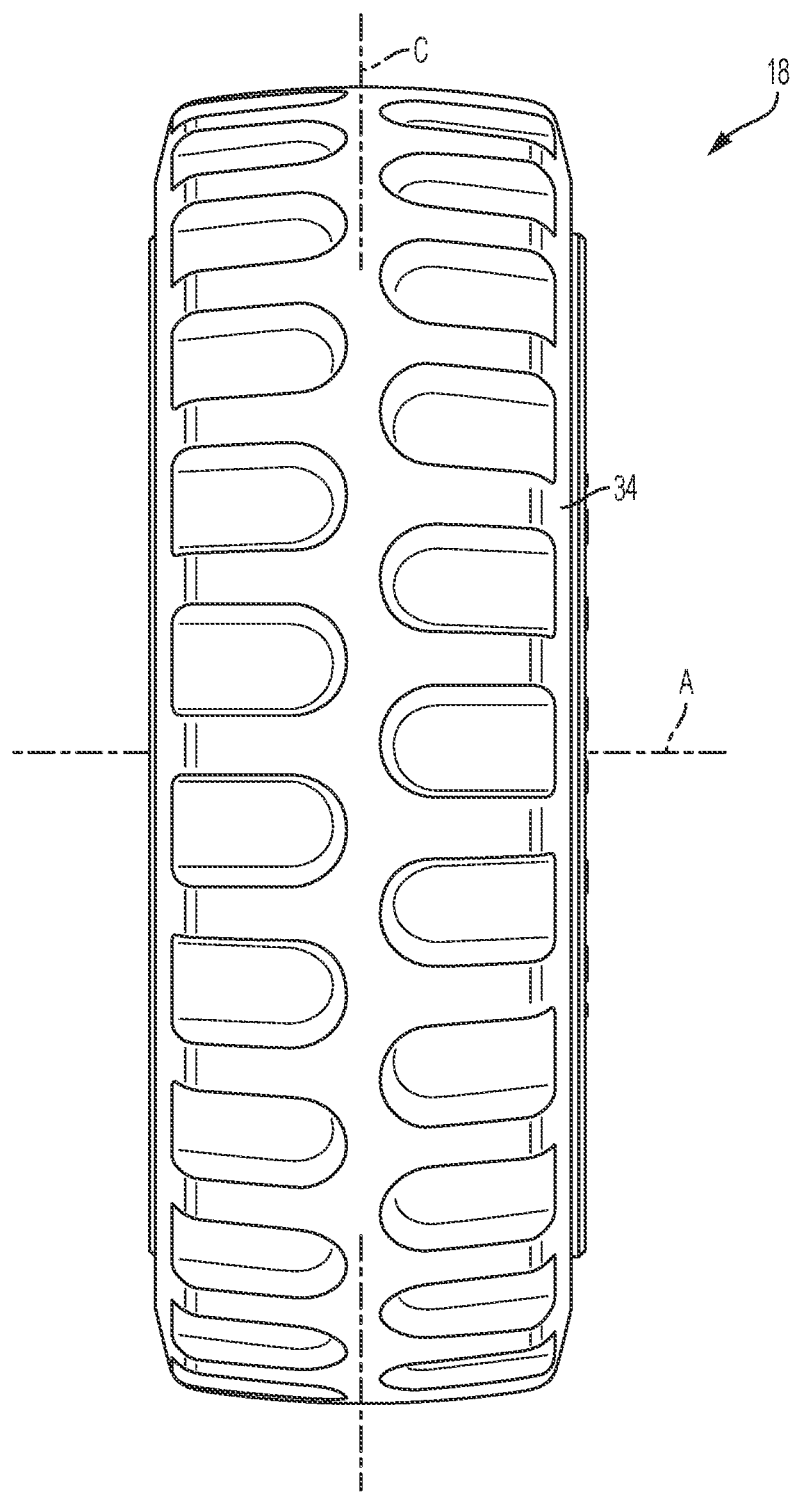
FIG. 7 is an end view of the wheel assembly shown in FIG. 3.

FIGS. 1-2 illustrate a wheeled device 10, such as a portable rolling tool bag, movable between and around various locations (e.g., work sites, construction sites, garages, etc.). Exemplary wheeled devices are shown and described in U.S. patent application Ser. No. 14/802,539, filed Jul. 17, 2015, the entire contents of which are hereby incorporated by reference. In other constructions (not shown), the wheeled device 10 may include a tool box, a storage device, a suitcase, a dolly, a hand truck, a cart, a wheel barrow, a stroller, a wheel chair, a bed, a table, etc.

The wheeled device 10 generally includes a frame 14 supported by one or more wheel assemblies 18. As a tool bag, the illustrated wheeled device 10 also includes a body 22 defining a storage compartment (not shown), capable of supporting and storing tools, accessories, materials, etc., in an organized manner. A handle assembly 26 facilitates maneuvering of the wheeled device 10.

FIGS. 3-22 illustrate a wheel assembly 18 for use with the wheeled device 10 and components of the wheel assembly 18. In the illustrated construction (see FIG. 2), the wheeled device 10 includes a wheel assembly 18 on each side (i.e., two wheel assemblies 18). The wheel assemblies 18 are rotatably supported on an axle 28 defining an axis of rotation and supported by the frame 14.

It should be understood that, in other constructions (not shown), the wheeled device 10 may include a single wheel assembly 18 (e.g., a wheel barrow with a single wheel) or more than two wheel assemblies 18 (e.g., a three- or four-wheeled cart). It should also be understood that, in some constructions (not shown), the wheeled device 10 may include one or more additional wheel assemblies different than the illustrated wheel assembly 18 (e.g., having a different size, construction, etc.).

With reference to FIGS. 1-7, the wheel assembly 18 includes a hub or central core 30 and a tire or over-molded outer portion 34. The core 30 has a central axis A, an annular body 38 formed about the central axis A and divided by a center plane C (see FIG. 7) perpendicular to the central axis A, and one or more features (see FIGS. 8-14) to which material of the outer portion 34 can be molded and/or into which material of the outer portion 34 can be filled when forming the outer portion 34, as described in more detail below. This arrangement may, for example, provide improved coupling, retention, etc. of the outer portion 34 to the core 30 without sole dependency on chemical adhesion between materials of these components 30, 34. Engagement of the material of the outer portion 34 and the feature(s) may inhibit and/or limit relative movement between the core 30 and the outer portion 34 radially, axially, circumferentially, etc. and combinations thereof.

With reference FIGS. 9-20, in the illustrated construction, the features include a number of projections 42 (e.g., fifteen shown) extending radially outwardly from a cylindrical outer surface 46 of the body 38 and spaced about the central axis A. For purposes of illustration, in FIGS. 9-14, the outer portion 34 is shown in broken lines as if transparent.

Each projection 42 is positioned on a radial axis B (see FIGS. 11 and 17) extending radially from the central axis A of the core 30. In the illustrated construction, the projections 42 are evenly circumferentially spaced about the central axis A such that the angles formed between any two adjacent radial axes B are equal. In the illustrated construction, each angle is approximately 24 degrees.

In some constructions, there may be more or fewer projections 42, spaced by any corresponding angle. In some constructions, the projections 42 may be spaced about the central axis A in any desired pattern (e.g., asymmetrically). The number, spacing, and structure of projections 42 may be determined based on, for example, the size and construction of the wheel assembly 18.

Figure 19:
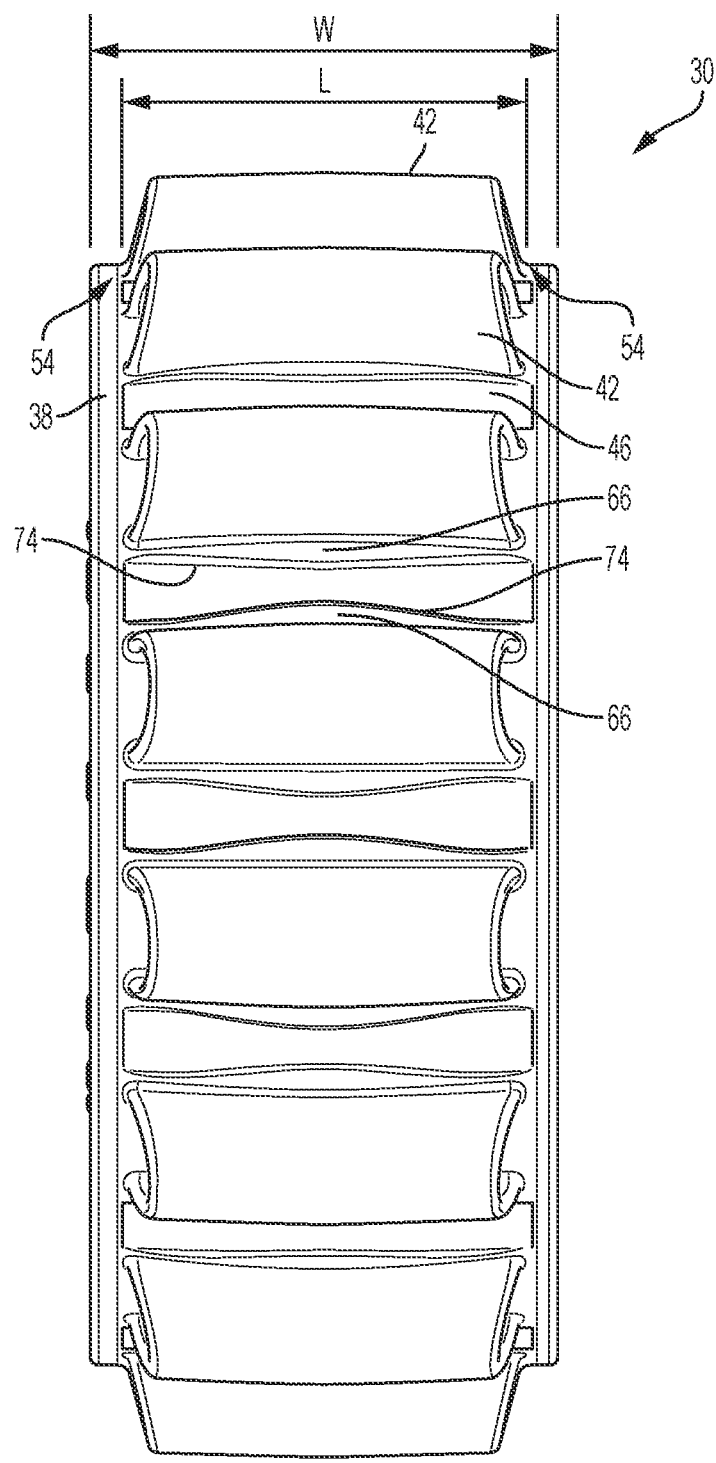
FIG. 19 is an end view of the core shown in FIG. 15.
Figure 21:
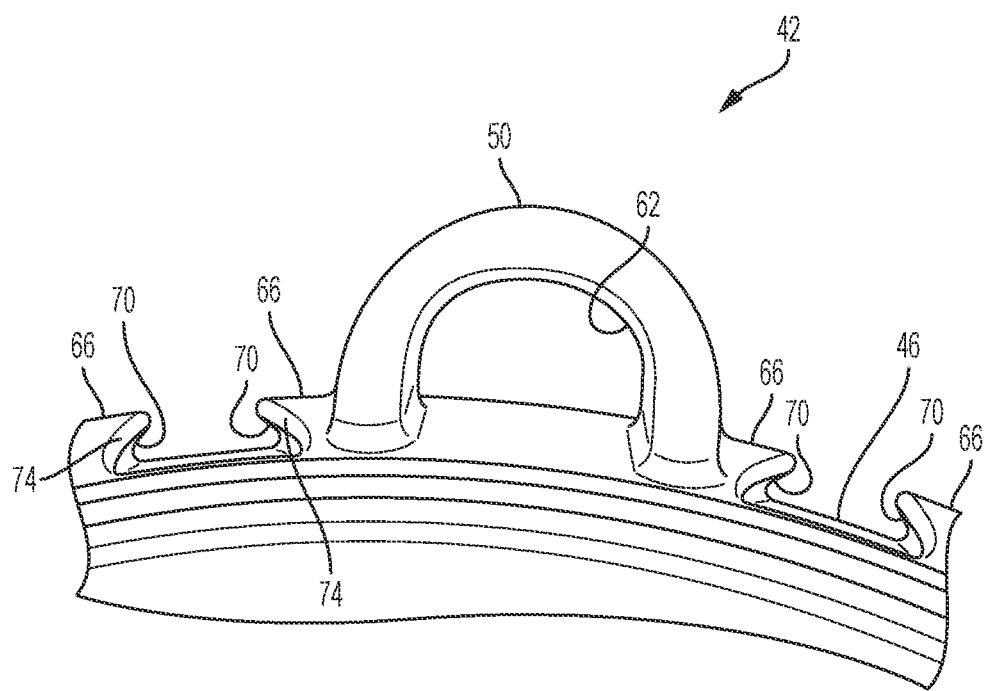
FIG. 21 is an enlarged front view of a projection extending form a body of the core of FIG. 15.

With reference to FIG. 21, in the illustrated construction, each projection 42 has an arcuate outer surface 50 such that the projection 42 has a generally semi-cylindrical cross-section in a plane perpendicular to the central axis A (e.g., in the central plane C). Each projection 42 has a length L extending parallel to the central axis A of the core 30 between axial ends 54 of the projection 42 (see FIGS. 8 and 19). As shown in FIG. 19, the length L of each projection 42 is less than a width W of the body 38 along the central axis A. Each axial end 54 of a projection 42 has an end surface sloped inwardly toward the center plane C of the core 30 and is substantially perpendicular to the axis A. The projections 42 and, in the illustrated construction, the shape of the projections 42 (e.g., as a half-circle (as shown), a triangle, rectangle, pyramid, etc.) may add strength, robustness, resilience, etc., to the core 30 and to the wheel assembly 18.

With continued reference to FIG. 21, as illustrated, each projection 42 defines a throughbore 62 and has two overhangs 66 each defining an undercut 70. The throughbore 62 extends through each projection 42 parallel to the central axis A. The throughbore 62 generally has a semi-cylindrical shape generally concentric with the outer surface 50 of the projection 42.

In other constructions (not shown), the throughbore 62 may have another shape and may include a plurality of throughbores extending through the projection 42. In further constructions (not shown), the throughbore 62 may extend partially through the projection 42 from one or both of the axial ends 54.

Each overhang 66 extends from an opposite circumferential side of a projection 42 substantially tangential to the outer surface 46 of the body 38. The undercuts 70 generally angle upwardly away from the outer surface 46 of the body 38. Adjacent overhangs 66 of adjacent projections 42 extend toward each other such that the undercuts 70 are in facing relation. In addition, as best shown in FIG. 19, a tapered surface 74 of each overhang 66 extends along the length of each projection 42 and traces a curved path that peaks at the central plane C of the core 30. Corresponding facing adjacent overhangs 66 define a "bow-tie" shape when viewed along a corresponding radial axis B.

Figure 8:
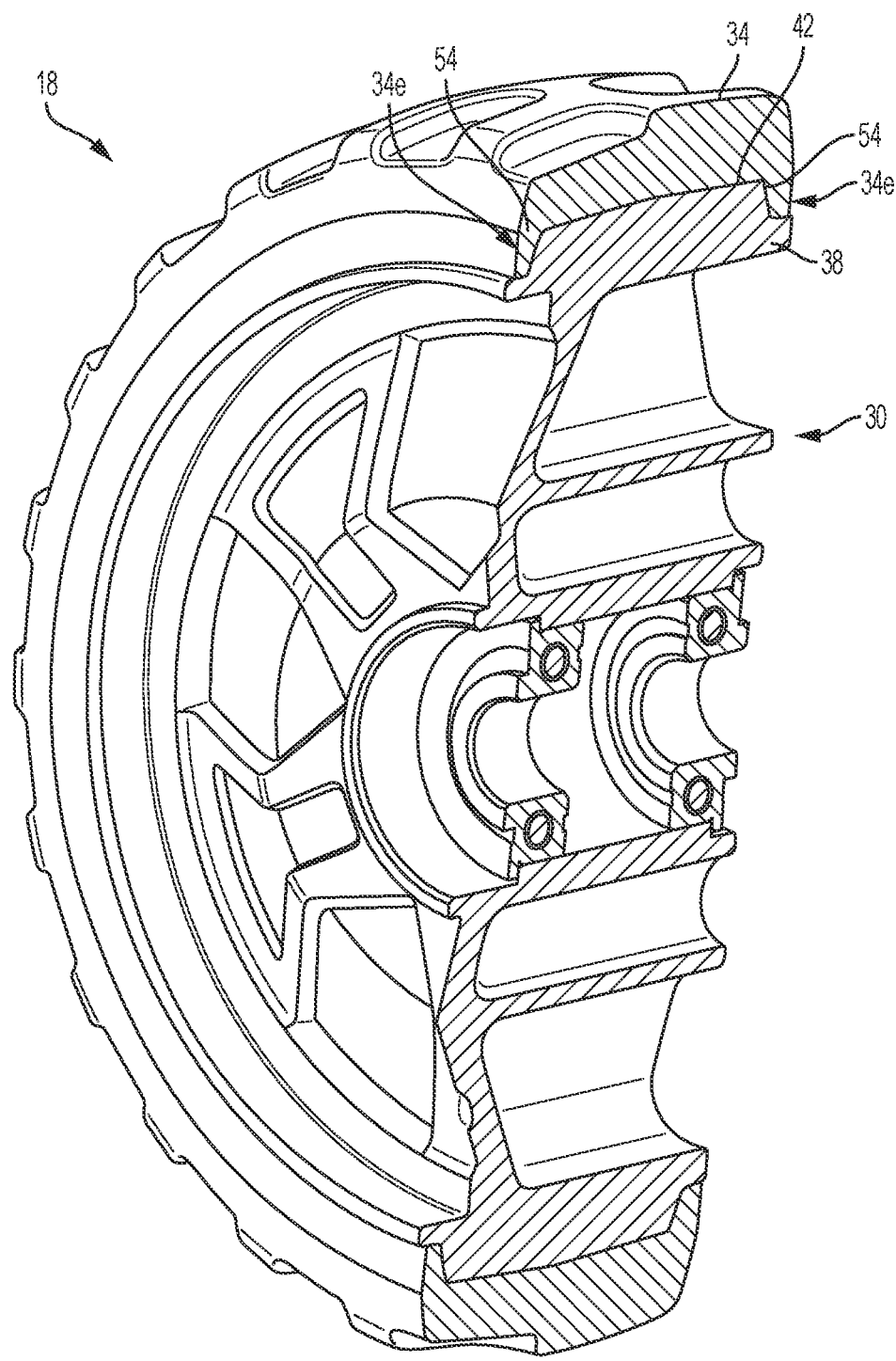
FIG. 8 is a cross-sectional view of the wheel assembly shown in FIG. 3, taken generally along line 8-8 in FIG. 5.
Figure 9:
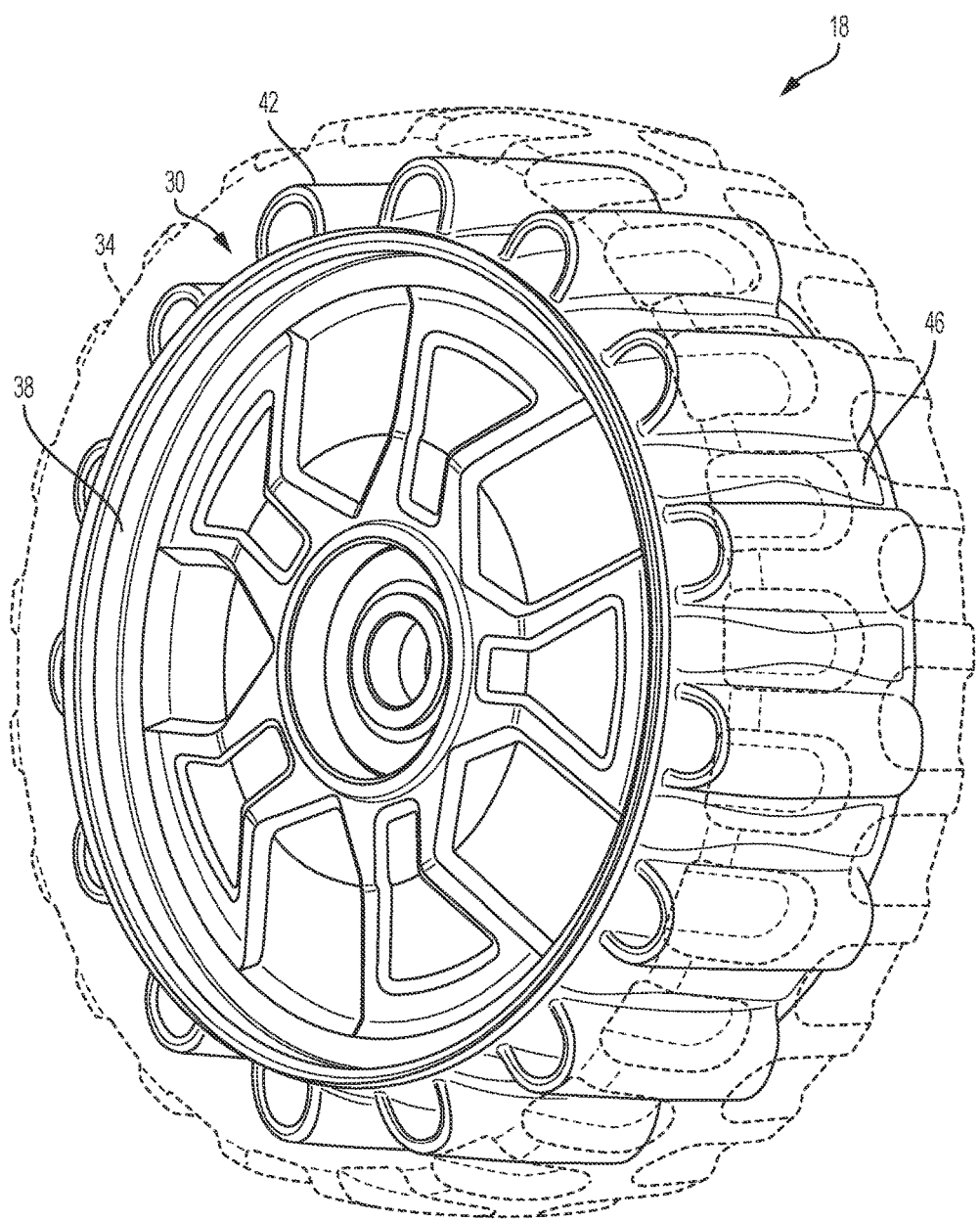
FIG. 9 is a front perspective of the wheel assembly shown in FIG. 3 with the outer portion shown as transparent.
Figure 10:
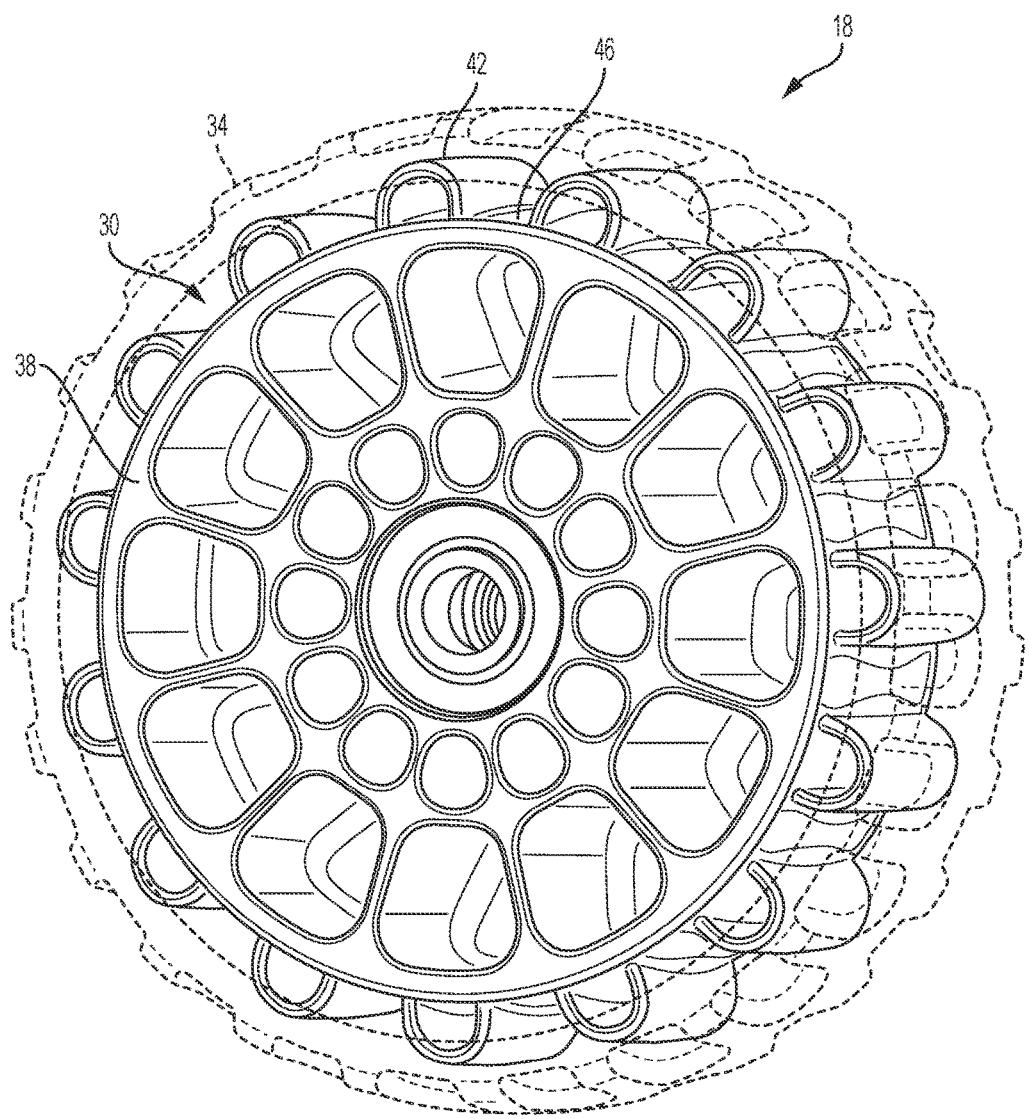
FIG. 10 is a rear perspective view of the wheel assembly as shown in FIG. 9.
Figure 11:
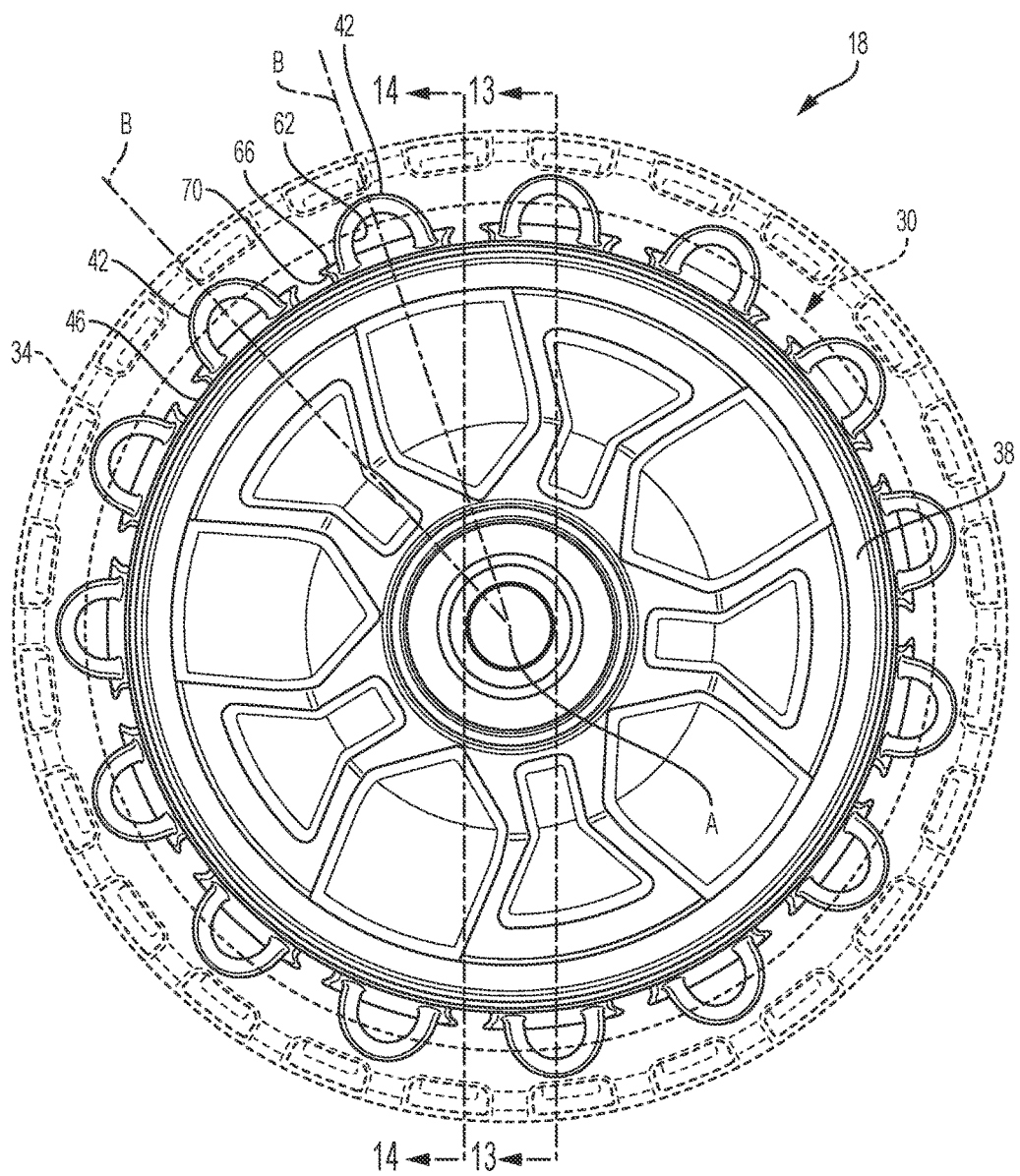
FIG. 11 is a front view of the wheel assembly as shown in FIG. 9.
Figure 12:
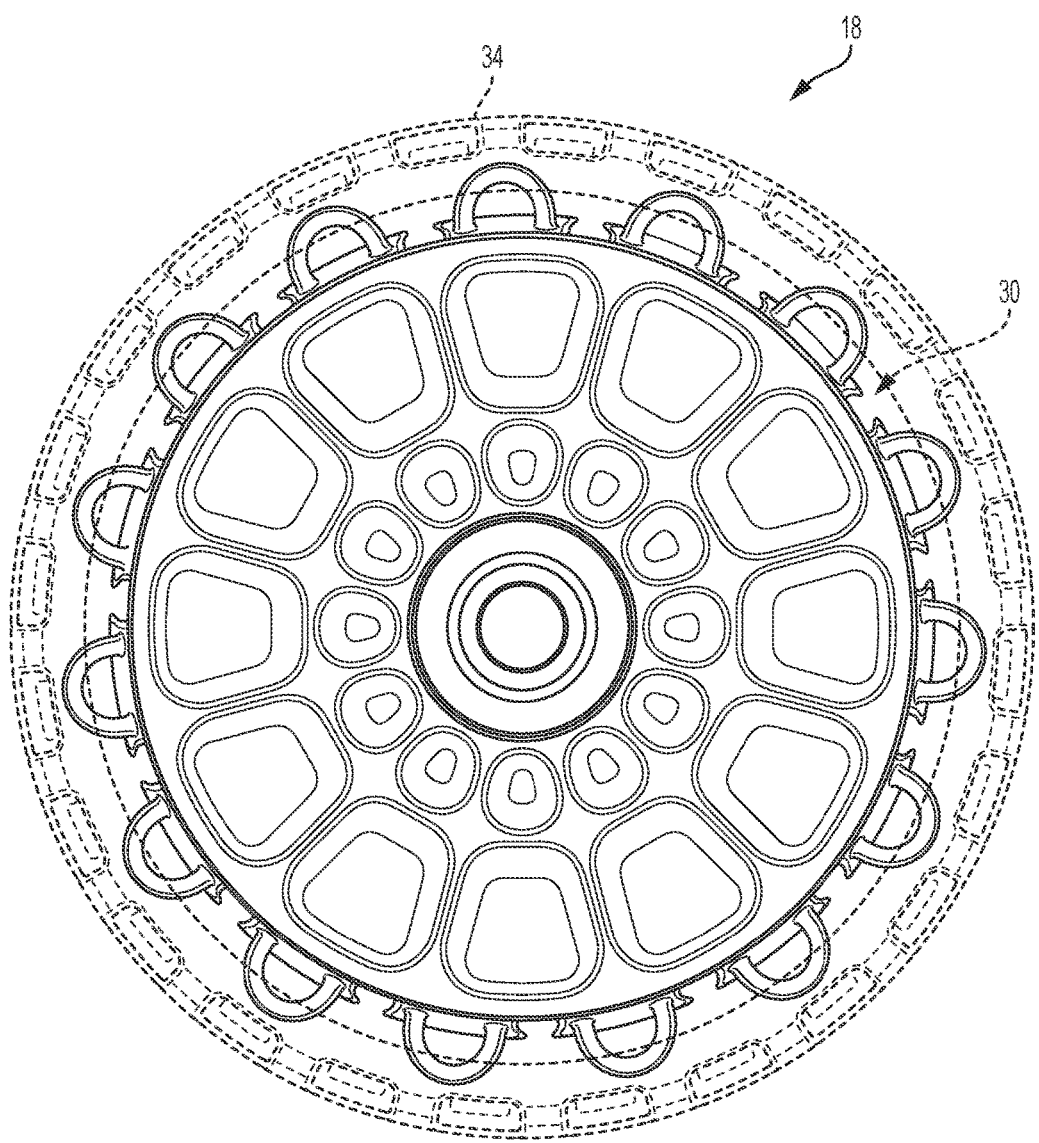
FIG. 12 is a rear view of the wheel assembly as shown in FIG. 9.
Figure 13:
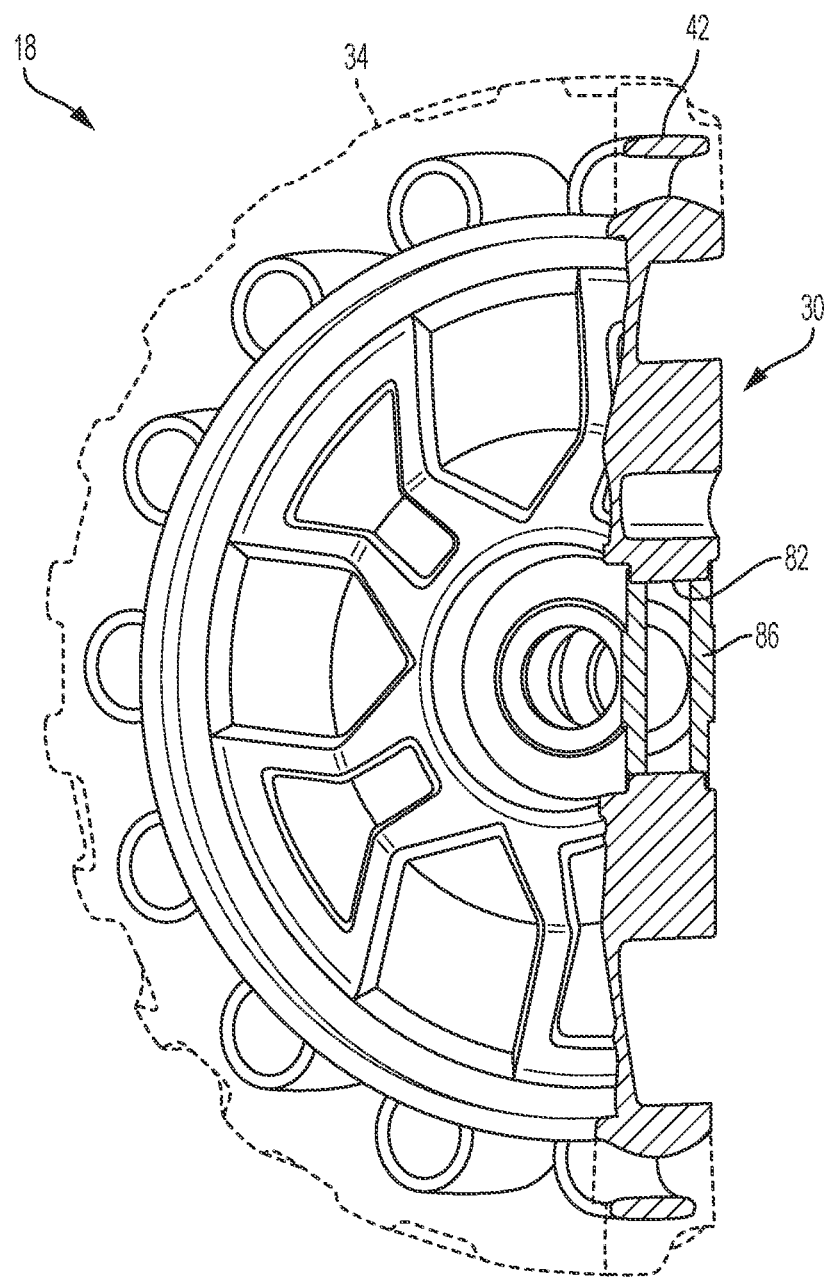
FIG. 13 is a cross-sectional view of the wheel assembly as shown in FIG. 9, taken generally along line 13-13 in FIG. 11.
Figure 14:
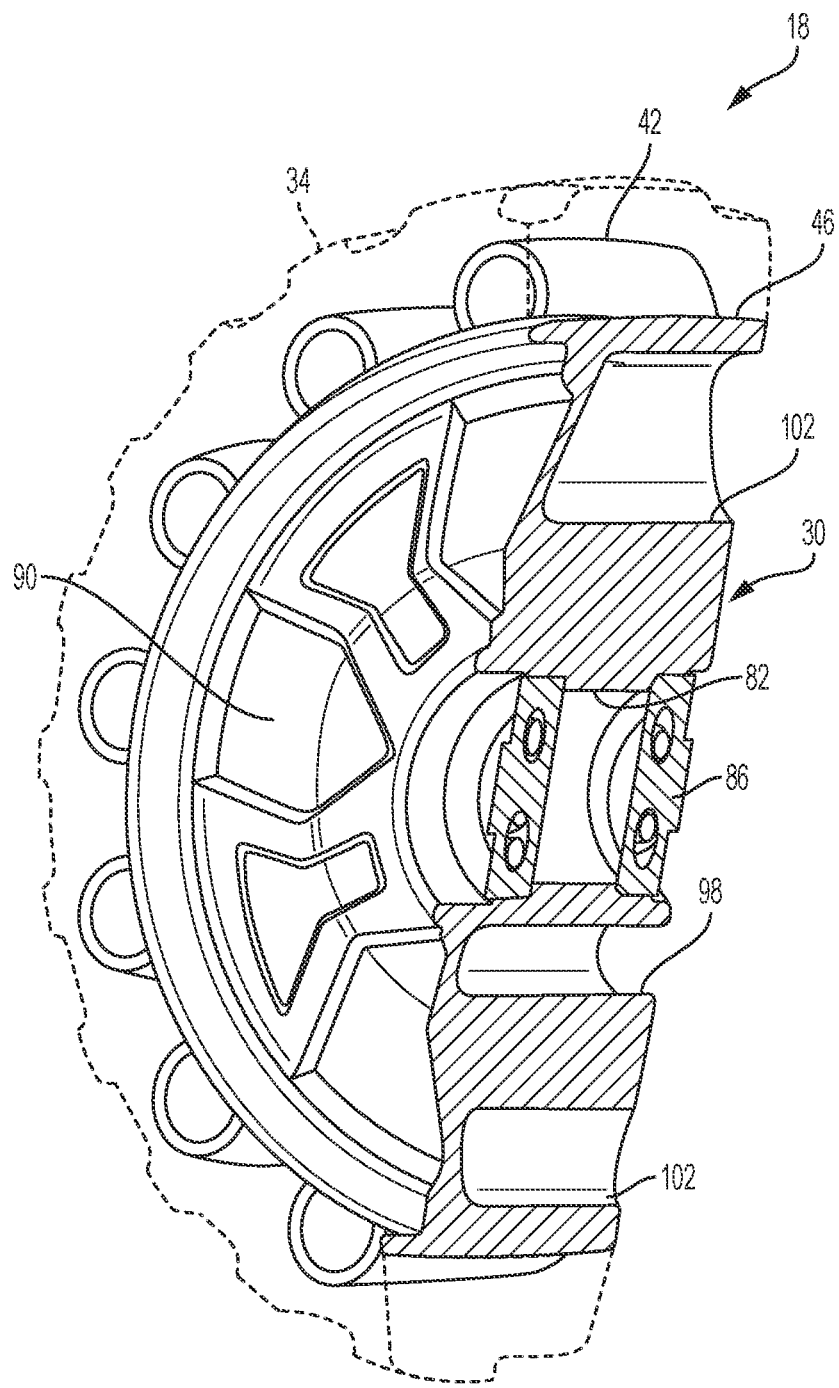
FIG. 14 is another cross-sectional view of the wheel assembly as shown in FIG. 9, taken generally along line 14-14 in FIG. 11.
Figure 15:
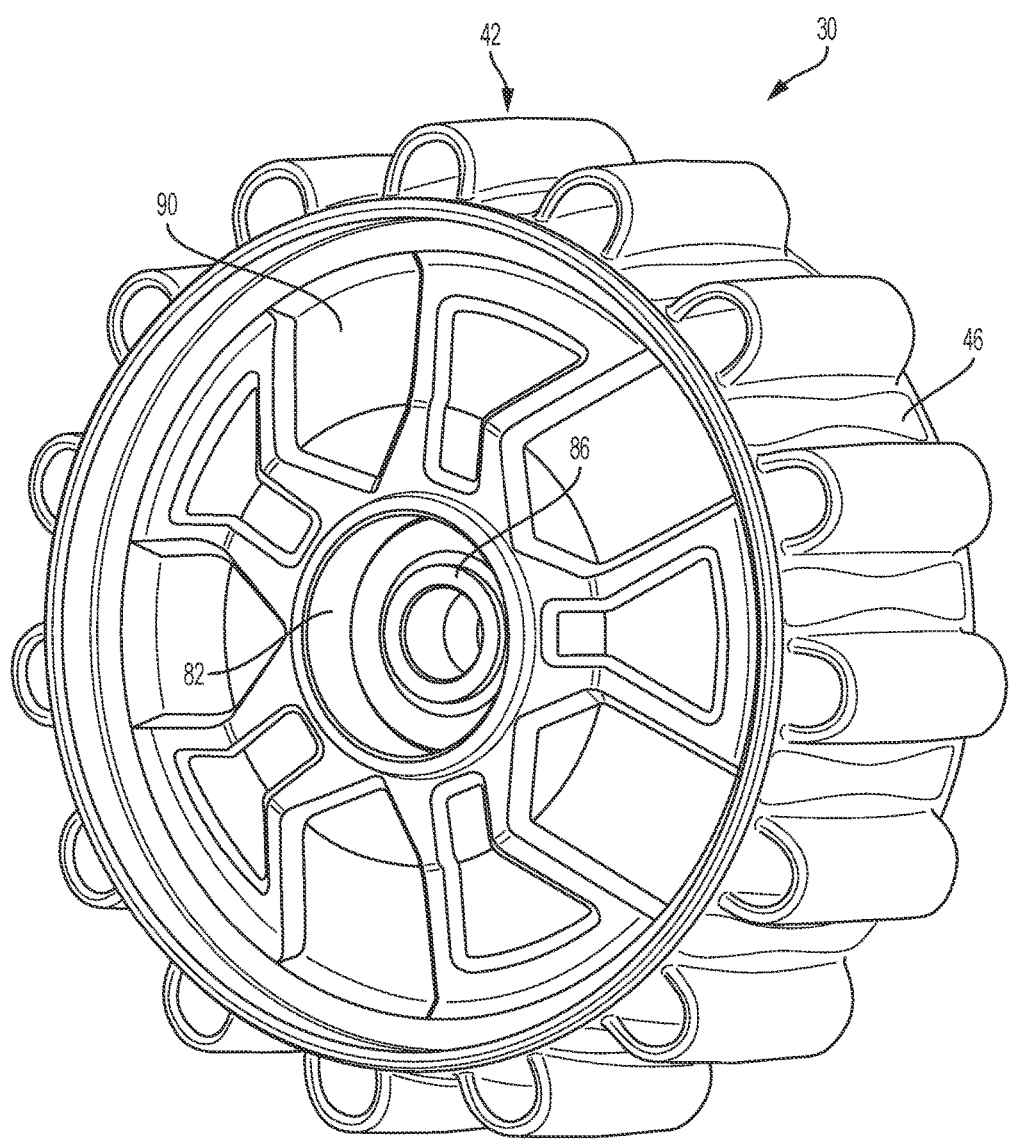
FIG. 15 is a front perspective of a core of the wheel assembly shown in FIG. 3.
Figure 22:
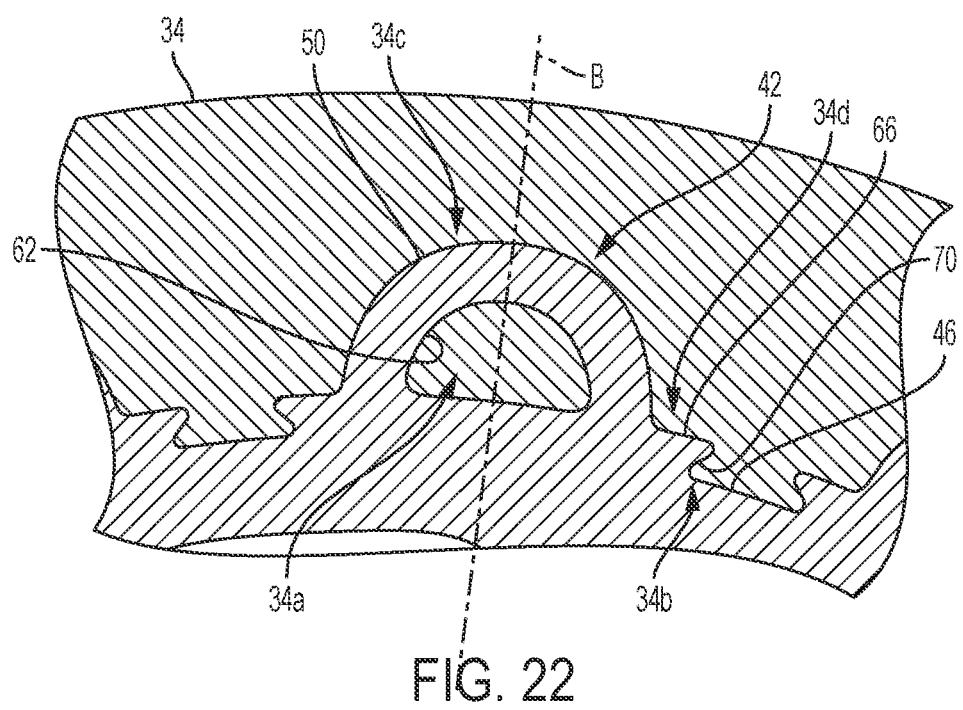
FIG. 22 is a cross-sectional view of the projection of FIG. 21 illustrating an over-molded portion coupled to the core via the projection.

With reference to FIGS. 8 and 22, material of the outer portion 34 is molded to and encompasses the projections 42, filling the throughbores 62 and the undercuts 70. Material 34a engages the projections 42 within the throughbores 62 and material 34b engages the overhangs 66 within the undercuts 70 to secure the outer portion 34 to the core 30.

With continued reference to FIG. 22, the radial axis B of each projection 42 extends from the central axis A so as to consecutively intersect the outer surface 46 of the core 30, material 34a of the outer portion 34 within the throughbore 62, the outer surface 50 of the projection 42, and material 34c of the outer portion 34 adjacent the outer surface 50 and radially farther from the central axis A. Accordingly, each projection 42 is sandwiched between the material 34a of the outer portion 34 within the throughbores 62 and the material 34c radially outward of the projections 42 (i.e., outward of the arcuate surface 50) along the radial axis B.

Similarly, material 34b within the undercuts 70 and material 34d radially outward of the overhangs 66 substantially encloses the overhangs 66 along the radial direction, and the material on either side of the overhangs 66 substantially encloses the overhangs 66 in the radial direction. As best shown in FIG. 8, material 34e of the outer portion 34 is also located adjacent each of the axial ends 54 of the projections 42 and connects the material 34a within the throughbores 62 and the material 34c radial outward of the projections 42 to axially enclose the projections 42. Accordingly, each projection 42 is sandwiched between the material 34d of the outer portion 34 adjacent each of the axial ends 54 of the projection 42 along the central axis A. Similarly, material on either side of the tapered surface 74 in axially parallel to the central axis A sandwiches the overhangs 66 along the central axis A.

In other constructions (not shown), the features may include a non-radial surface/structure or a surface/structure having a non-radial component (e.g., circumferential, tangential, angled, etc.) extending from the body 38 to inhibit the outer portion 34 from moving radially away from the core 30. In some constructions (as illustrated), the features are configured in such a manner as to be able to be formed without a molding undercut (e.g., the structural features are arranged in a "mold-pull" direction (as illustrated, parallel to the axis of rotation A of the wheel assembly 18)) so that the core 30 can be formed in a single shot of a molding process, as described below. Examples of such features (not shown) include T-shaped projections, L-shaped projections, hollow rectangular-shaped projections, etc., again arranged in the mold-pull direction (i.e., the "shape" is defined by a cross-section of the projection taken along the axis A).

In other constructions (not shown), a ridge generally perpendicular to the axis A could be formed on the core 30 extending circumferentially within the center plane C (i.e., at the part line of the mold), and material of the outer portion 34 could engage that ridge. In such constructions, the ridge may also define apertures extending parallel to the axis through which material of the outer portion 34 may also engage.

With reference to FIGS. 15-20, the core 30 defines a central opening 82 for receiving the axle 28. In the illustrated construction, at least one bearing assembly 86 is supported in the opening 82 to receive the axle 28.

Figure 16:
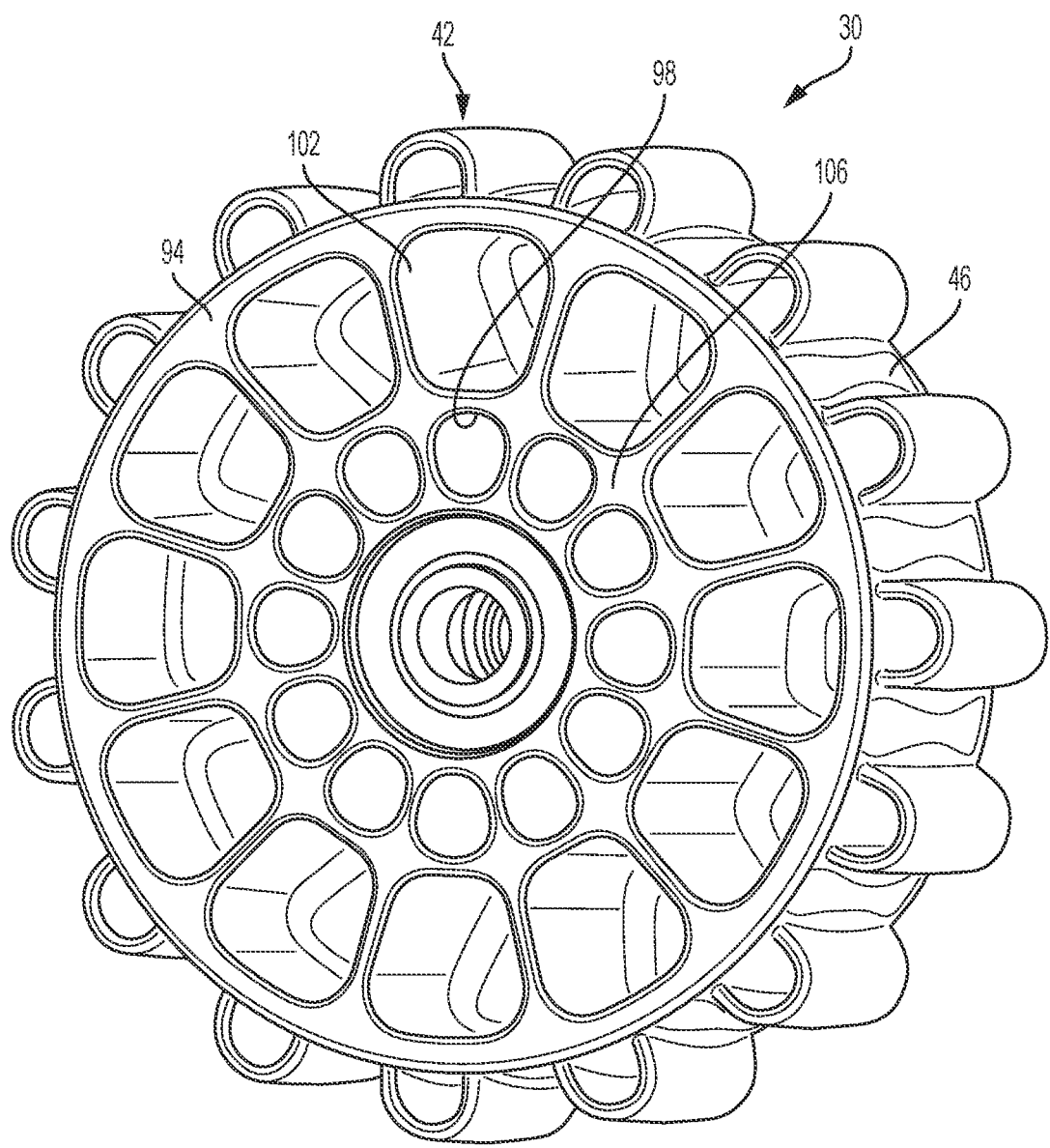
FIG. 16 is a rear perspective view of the core shown in FIG. 15.
Figure 17:
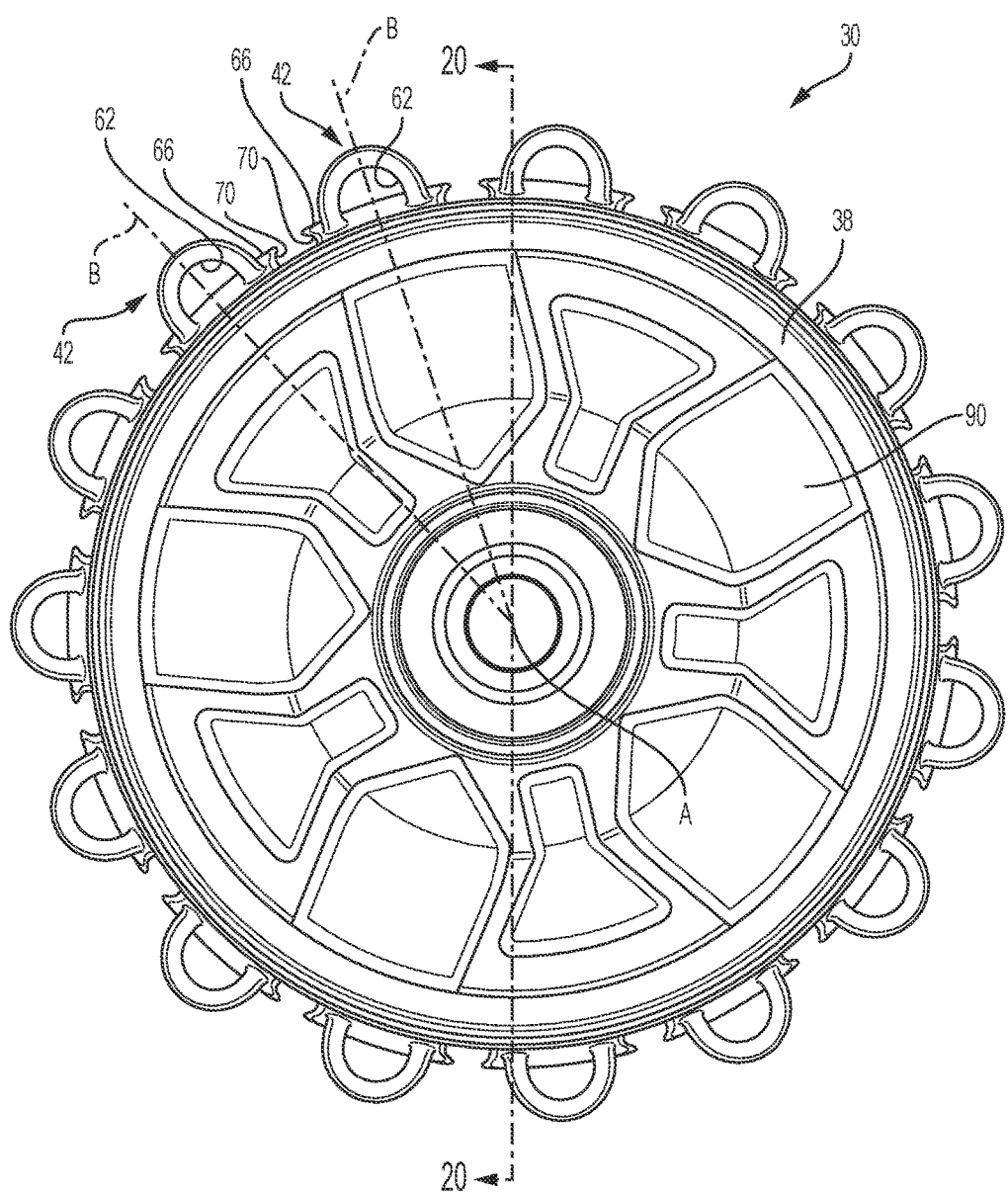
FIG. 17 is a front view of the core shown in FIG. 15.
Figure 18:
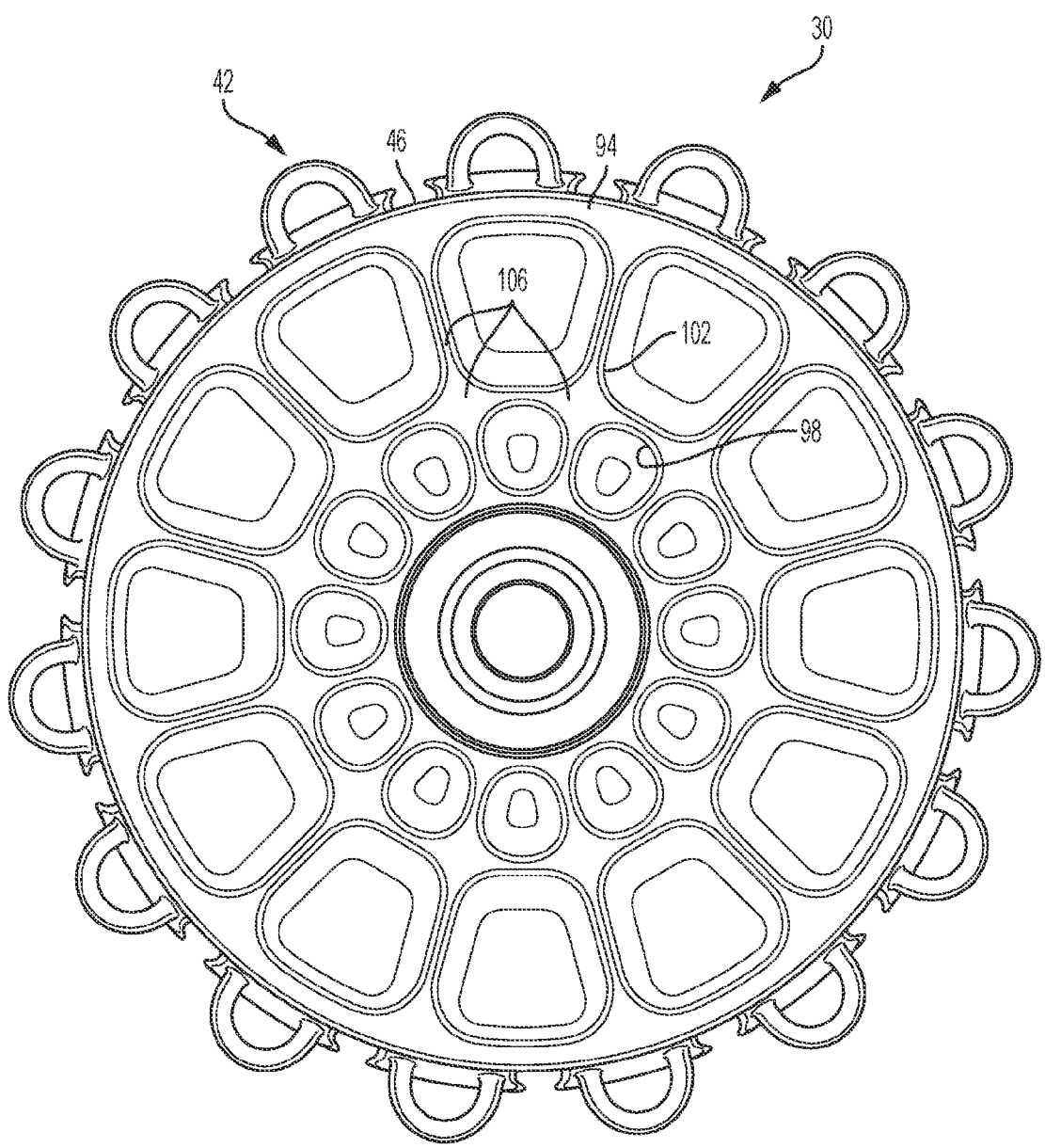
FIG. 18 is a rear view of the core shown in FIG. 15.
Figure 20:
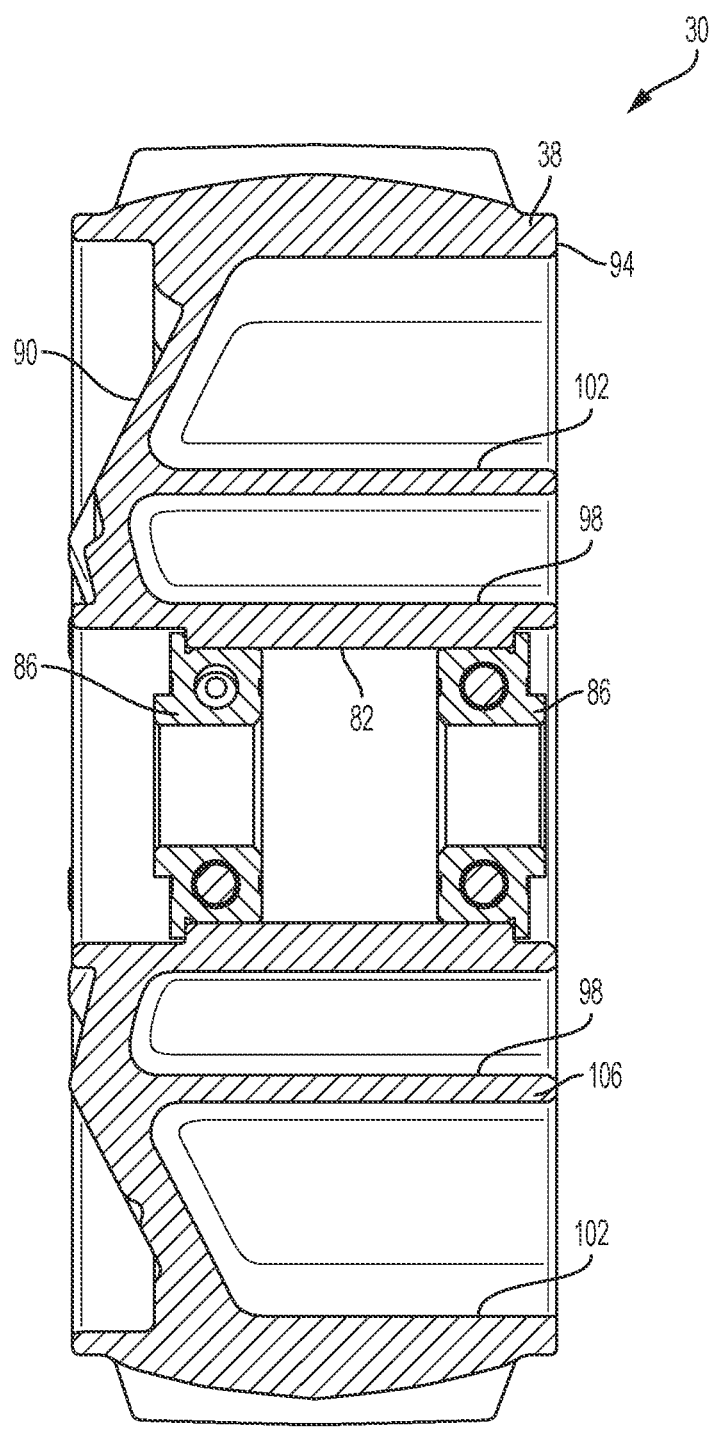
FIG. 20 is a cross-sectional view of the core shown in FIG. 15, taken generally along line 20-20 in FIG. 17.

The core 30 has a front face 90 (see FIGS. 15 and 17) and a rear face 94 (see FIGS. 16 and 18) formed with the desired structure and appearance. The illustrated front face 90 is a solid surface from the opening 82 to the outer radial edge. Recesses 98, 102 are defined into the rear face 94 and are arranged about the opening 82. As shown in FIG. 20, the recesses 98, 102 extend substantially through the core 30 toward the front face 90. The illustrated recesses 98, 102 reduce the material of the core 30, occupying a substantial volume of the core 30. As best shown in FIG. 16, a web 106 is formed by material between and around the recesses 98, 102 providing structural support to the core 30.

In the illustrated construction, the core 30 is generally formed of relatively hard material (e.g., hard plastic, polypropylene (PP), nylon, metal, etc.). The outer portion 34 is formed of relatively softer material (e.g., soft plastic, urethane (e.g., thermoplastic polyurethane (TPU)), rubber, etc.). The materials of the core 30 and the outer portion 34 may be selected so as to chemically adhere to provide additional coupling, retention, etc. of the outer portion 34 to the core 30.

During manufacture of the illustrated wheel assembly 18, the wheel assembly 18 is formed by a two-shot molding process. As discussed above, the core 30 is constructed to be molded in a single, first shot, after which the outer portion 34 is molded to the core 30 in a second shot.

In the illustrated embodiment, the core 30 is formed by injecting the material of the core 30 into a first mold and allowing the material to set or harden. The first mold defines a cavity defining the shape of the core 30 including all structure (e.g., the projections 42 with the throughbores 62 and/or the undercuts 70; the opening 82; the recesses 98, 102). During forming of the core 30, all structure of the core 30 is formed, and these structures are arranged in the mold-pull direction. In other words, these structures are arranged such that there is no structure that prevents the removal of the core 30 from a first mold (or, alternatively, the first mold being moved away from the core 30) without using a molding undercut. In the illustrated embodiment the mold-pull direction is parallel with the central axis A.

After forming the core 30, it is removed and placed in a second mold (or, alternatively, the first mold is moved away from the core 30 and the second mold is moved into place to encompass the core 30). Once the core 30 is enclosed within the second mold, material of the outer portion 34 is injected into the second mold. The material of the outer portion 34 is flowed into and around the features (e.g., the throughbores 62 and/or the undercuts 70) provided on the core 30 to fill and encompass the projections 42.

In other constructions (not shown), the wheel assembly 18 or portions of the wheel assembly 18 may be formed in another process/combination of processes. For example, the core 30 could be formed by a different process (e.g., stamping, welding), and the outer portion 34 could then be molded onto the core 30.

During use of the wheeled device 10, the wheel assemblies 18 support the wheeled device 10 and freely rotate on the axle 28 about their central axis A to allow a user to move the wheeled device 10 by pulling or pushing the wheeled device 10 along a surface while grasping the handle assembly 26. As the wheeled device 10 is maneuvered and the wheel assemblies 18 rotate, forces may be applied tangentially, axially, and/or normal to each of the wheel assemblies 18.

As axial forces are applied to each wheel assembly 18 and, more specifically, to the outer portion 34, parallel to the central axis A, engagement between surfaces of the core 30 and the outer portion 34 that are non-parallel (e.g., perpendicular or at an angle) to the central axis A causes the core 30 to provide structural support to the outer portion 34, thereby limiting axial movement of the outer portion 34 relative to the core 30 and inhibiting decoupling of the outer portion 34 from the core 30. In particular, the material of the outer portion 34 adjacent each of the axial ends 54 of the projections 42 engages the axial ends 54 of the projections 42 when an axial force is applied in a corresponding direction parallel to the central axis A of the wheel assembly 18. Similarly, the material of the outer portion 34 engages the tapered surface 74 of the overhangs 66 when the axial force is applied parallel to the central axis A, because the tapered surface 74 is non-parallel to the central axis A.

As tangential forces are applied to each wheel assembly 18 and, more specifically, tangential to the outer portion 34, engagement between radial surfaces of the core 30 and the outer portion 34 cause the radial surfaces of the core 30 to provide structural support to the outer portion 34, thereby limiting rotational movement of the outer portion 34 relative to the core 30 about the central axis A. In particular, the material of the outer portion 34 engages the outer surfaces 50 of the projections 42 and the interior surfaces of the projections 42 within the throughbores 62 in a tangential direction to inhibit the outer portion 34 from pivoting (e.g., spinning) on the core 30 about the central axis A. Similarly, the material of the outer portion 34 engages the overhangs 66 within the undercuts 70 in a tangential direction to also inhibit the outer portion 34 from pivoting (e.g., spinning) on the core 30 about the central axis A.

Additionally, the outer portion 34 is supported in the radial direction through engagement of the material of the outer portion 34 within the throughbores 62 by the projections 42 and within the undercuts 70 by the overhangs 66, thereby limiting movement of the outer portion 34 in the radial direction to retain the outer portion 34 coupled with the core 30.

It should be understood that, except when mutually exclusive or physically incompatible, individual features of the above-described wheel assembly 18 may be used with or without other features of the wheel assembly 18. Although the invention has been described in detail with reference to certain preferred embodiments, variations and modifications exist within the scope and spirit of one or more independent aspects of the invention as described or illustrated.

One or more independent features and/or independent advantages of the invention may be set forth in the claims.

The invention claimed is:

1. A wheel assembly for a wheeled device, the wheel assembly comprising:
   a core including an annular body defining a central axis and one or more projections extending from the body, each of the one or more projections having a wall defining a bore extending parallel to the central axis, each of the one or more projections including an overhang defining an undercut extending parallel to the central axis, the overhang and the undercut being circumferentially spaced from an associated wall, the overhang and the undercut being spaced radially inwardly from a radially outward portion of the associated wall; and
   an outer portion coupled to the core and having material positioned within the bore and within the undercut of each of the one or more projections to limit radial movement of the outer portion relative to the core.

2. The wheel assembly of claim 1, wherein each of the one or more projections extends radially from the body.

3. The wheel assembly of claim 2, wherein the outer portion encompasses each of the one or more projections.

4. The wheel assembly of claim 1, wherein the outer portion encompasses each of the one or more projections.

5. The wheel assembly of claim 1, wherein each of the one or more projections has a length parallel to the central axis and a semi-cylindrical cross-section in a plane perpendicular to the length.

6. The wheel assembly of claim 1, wherein each of the one or more projections has a surface engaged by the outer portion to inhibit rotational movement of the outer portion relative to the core about the central axis.

7. The wheel assembly of claim 1, wherein each of the one or more projections has a surface engaged by the outer portion to inhibit axial movement of the outer portion relative to the core along the central axis.

8. The wheel assembly of claim 1, wherein the core is formed of a hard material and the outer portion is formed of a relatively softer material.

9. The wheel assembly of claim 1, wherein the outer portion is over-molded onto the core.

10. The wheel assembly of claim 1, wherein the overhang is a first overhang defined by a first projection of the one or more projections, the wheel assembly further comprising a second overhang defined by a second projection of the one or more projections, the first overhang and the second overhang arranged in a facing relationship.

11. The wheel assembly of claim 10, wherein the first overhang and the second overhang defining a bow-tie shape therebetween.

12. The wheel assembly of claim 1, wherein a plane extends through a center of the annular body orthogonal to the central axis, the projections extending along a length parallel to the central axis and on both sides of the plane.

13. A wheeled device comprising:
    a frame; and
    a wheel assembly supporting the frame, the wheel assembly including
       a core coupled to the frame for pivoting movement about a central axis, the core including a body and one or more projections extending from the body, each of the one or more projections having a wall defining a bore extending parallel to the central axis, each of the one or more projections including an overhang defining an undercut extending parallel to the central axis, the overhang and the undercut being circumferentially spaced from an associated wall, the overhang and the undercut being spaced radially inwardly from a radially outward portion of the associated wall, and
       an outer portion coupled to the core, the outer portion having material positioned within the bore and within the undercut of each projection to limit movement of the outer portion relative to the core.

14. The wheeled device of claim 13, wherein each of the one or more projections extends radially from the body.

15. The wheeled device of claim 13, wherein each of the one or more projections has a length parallel to the central axis and a semi-cylindrical cross-section perpendicular to the length.

16. The wheeled device of claim 15, wherein engagement of the material of the outer portion and the projection limits relative movement between the core and the outer portion at least one of radially, axially, and circumferentially.

17. The wheel assembly of claim 13, wherein the overhang is a first overhang defined by a first projection of the one or more projections, the wheel assembly further comprising a second overhang defined by a second projection of the one or more projections, the first overhang and the second overhang arranged in a facing relationship and defining a bow-tie shape therebetween.

18. A method of manufacturing a wheel assembly for a wheeled device, the method comprising:
    forming a core including a body and one or more projections extending from the body, forming the one or more projections including forming, in each of the one or more projections, a wall defining a bore, an overhang, and an undercut extending along a mold-pull direction, the overhang and the undercut being circumferentially spaced from an associated wall, the overhang and the undercut being spaced radially inwardly from a radially outward portion of the associated wall; and
    forming an outer portion onto the core including providing material of the outer portion within the bore and within the undercut.

19. The method of claim 18, further comprising injecting material of the outer portion into a mold containing the core to encompass the one or more projections when forming the outer portion.

20. The method of claim 18, wherein forming the outer portion includes injecting material of the outer portion into a mold containing the core, filling the bore and the undercut in each of the one or more projections, and encompassing each of the one or more projections when forming the outer portion.

21. The method of claim 18, wherein forming the core is performed as a first shot of a two-shot injection molding process, and wherein forming the outer portion onto the core is performed as a second shot of the injection molding process.

22. The method of claim 18, wherein the overhang is a first overhang defined by a first projection of the one or more projections, and wherein the method further comprises forming a second overhang defined by a second projection of the one or more projections, the first overhang and the second overhang being arranged in a facing relationship and defining a bow-tie shape therebetween.

\* \* \* \* \*